(12) United States Patent
Hemo et al.

(10) Patent No.: US 7,406,981 B2
(45) Date of Patent: Aug. 5, 2008

(54) LIQUID DISCHARGE APPARATUS PARTICULARLY USEFUL AS A PORTABLE INOCULATION GUN FOR ANTI-VIRUS INOCULATION OF PLANTS

(75) Inventors: Rony Hemo, MP HaNegev (IL); Italy Maoz, Doar-Na HaNegev (IL); Yarden Dloomy, Nahal Soreq (IL); Gal Yarden, MP HaNegev (IL)

(73) Assignee: Bio-Oz Biotechnologies Ltd., Yad Mordechay, Doar-Na Hof Ashkelon (IL)

( * ) Notice: Subject to any disclaimer, the term of this patent is extended or adjusted under 35 U.S.C. 154(b) by 0 days.

(21) Appl. No.: 10/553,263

(22) PCT Filed: Apr. 13, 2004

(86) PCT No.: PCT/IL2004/000322
§ 371 (c)(1),
(2), (4) Date: Mar. 28, 2007

(87) PCT Pub. No.: WO2004/089061
PCT Pub. Date: Oct. 21, 2004

(65) Prior Publication Data
US 2007/0267066 A1 Nov. 22, 2007

Related U.S. Application Data

(60) Provisional application No. 60/461,823, filed on Apr. 11, 2003.

(51) Int. Cl.
*F16L 3/00* (2006.01)
(52) U.S. Cl. ..................................................... 137/343
(58) Field of Classification Search ....................... None
See application file for complete search history.

(56) References Cited

U.S. PATENT DOCUMENTS 6,644,341 B1 * 11/2003 Chemo et al. ............... 137/343
6,820,638 B1 * 11/2004 Gosinski ..................... 137/377

* cited by examiner

*Primary Examiner*—K. Feggins

(57) ABSTRACT

Liquid discharge apparatus, particularly useful as a portable inoculation gun for anti-virus inoculation of plants, includes a housing having a handle at one end configured for convenient grasping by a user, a nozzle at the opposite end for discharging liquid from a discharge opening therein, and a manipulable member manually actuatable to produce a discharge of liquid from the nozzle. The nozzle includes a gas passageway communicating with the discharge opening, and a liquid passageway communicating with the gas passageway. A gas delivery system is actuatable by the manipulable member to discharge gas at high-velocity through the discharge opening via the gas passageway. A liquid source communicates with the liquid passageway in the nozzle such that each high-velocity discharge of gas from the nozzle via the gas passageway draws a quantity of liquid from the liquid source into the gas passageway and discharges it at high-velocity with the gas through the discharge opening.

20 Claims, 4 Drawing Sheets

LIQUID DISCHARGE APPARATUS PARTICULARLY USEFUL AS A PORTABLE INOCULATION GUN FOR ANTI-VIRUS INOCULATION OF PLANTS

RELATED APPLICATIONS

This application is a National Phase Application of PCT Applicaton No. PCT/IL2004/000322 having International Filing Date of Apr. 13, 2004, which claims the benefit of U.S. Provisional Patent Application No. 60/461,823, filed on Apr. 11, 2003. The contents of the above Application are all incorporated herein by reference.

FIELD AND BACKGROUND OF THE INVENTION

The present invention relates to liquid discharge apparatus for discharging a liquid at a high velocity. The invention is particularly useful when implemented in a portable inoculation gun for anti-virus inoculation of plants, and is therefore described below with respect to such an implementation, but it will be appreciated that the invention could advantageously be implemented in many other types of liquid-discharge device.

It has been known for many years, but not widely appreciated, that plants can be protected from a severe, deliberating virus by prior infection with a mild strain of a closely related virus. This is known as cross-protection. As described in our prior International Application PCT/IL00/00039 (U.S. Pat. No. 6,644,341), the contents of which are incorporated herein by reference, the mild viruses previously introduced for cross-protection had to be inoculated by hand-rubbing mechanical friction. This confined the number of plants that could be infected and restricted the use of the method to instances where labor costs are negligible or the value of each plant is high. Moreover, the inoculation efficiency (i.e. the percentage of plants successfully infected) by the hand-friction method is usually not high enough for commercially relevant protection. Application PCT/IL/00/00039 described a multi-barrel plant inoculation gun which facilitated, for the first time, robust inoculation of up to 250,000 plantlets in a working day, compounded by very high efficiencies. However, the method of that application is restricted to use in nurseries where trays bearing plantlets are transported on a conveyer belt and are subject to jet-propulsion from the machine as described therein. Such a method can only be used with respect to young plantlets before transfer to the field, and not with respect to plants directly sown in the field or, for example, fruit trees.

OBJECTS AND BRIEF SUMMARY OF THE PRESENT INVENTION

An object of the present invention is to provide a novel liquid discharge apparatus for discharging a small quantity of a liquid with a high-velocity discharge of a gas. Another object of the present invention is to provide such a liquid discharge apparatus particularly useful as a portable inoculation gun for anti-virus inoculation of plants.

According to one aspect of the present invention, there is provided liquid discharge apparatus, comprising a portable liquid applicator unit including housing having a handle at one end configured for convenient grasping by a user, a nozzle at the opposite end for discharging liquid from a discharge opening therein, and a manipulable member manually actuatable to produce a discharge of liquid from the nozzle; the nozzle including a gas passageway communicating with the discharge opening, and a liquid passageway communicating with the gas passageway, a gas delivery system actuatable by the maniputable member to discharge gas at high-velocity through the discharge opening in the nozzle via the gas passageway therein; and a liquid source communicating with the liquid passageway in the nozzle such that each high-velocity discharge of gas from the nozzle via the gas passageway draws a quantity of liquid from the liquid source into the gas passageway and discharges same at high-velocity with the gas through the discharge opening.

According to further features in the preferred embodiment of the invention described below, the gas delivery system includes a reservoir within the housing defining a predetermined volume of pressurized gas, and a control device actuatable by the manipulable member to deliver from the reservoir the predetermined volume of pressurized gas in the form of a high-velocity pulse to the gas channel in the nozzle and to discharge same, with the quantity of liquid drawn therein, through the discharge opening.

In the described preferred embodiment, the gas delivery system further includes an external source of pressurized gas externally of the housing and connected to the reservoir within the housing for supplying pressurized gas thereto.

According to additional features in the described preferred embodiment, the gas delivery system further includes a quick-exhaust valve having a valve inlet communicating with the gas reservoir, and a valve outlet controlled by a control member. The control member is actuatable to a first position closing the valve outlet to permit the reservoir to be pressurized with gas from the external source, and to a second position opening the valve outlet to discharge a gas pulse at high-velocity therethrough and through the discharge opening in the nozzle via the gas passageway in the nozzle.

According to a still further feature in the described preferred embodiment, the gas passageway in the nozzle is reduced in cross-section for a portion of its length, the liquid passageway in the nozzle communicating with the gas passageway at the portion thereof of reduced cross-section to thereby increase, by the Venturi effect, the quantity of liquid drawn into the gas and discharged therewith through the discharge opening.

According to another aspect of the present invention, there is provided a liquid discharge apparatus, comprising: a housing including a nozzle having a discharge opening, a gas passageway communicating with the discharge opening, and a liquid passageway communicating with the gas passageway, a gas delivery system including a reservoir within the housing defining a predetermined volume of pressured gas, and a control device actuatable to deliver from the reservoir the predetermined volume of pressurized gas in the form of a high-velocity pulse to the gas passageway in the nozzle for discharge through the discharge opening therein; and a liquid source communicating with the liquid passageway in the nozzle such that each high-velocity discharge of gas from the nozzle via the gas passageway draws a quantity of liquid from the liquid source and discharges same at high-velocity with the gas through the discharge opening.

The invention is particularly useful, and is therefore described below, as embodied in a portable inoculation gun for anti-virus inoculation of plants, wherein the gas delivery system delivers compressed air, and the liquid source delivers a plant anti-virus inoculation liquid.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiment described is for purposes of example only, and that the invention is capable of being embodied in other forms and applications than described herein.

DESCRIPTION OF A PREFERRED EMBODIMENT

As indicated above, the novel liquid discharge apparatus of the present invention is particularly useful as a portable inoculation gun for anti-virus inoculation of plants. The description below, therefore, relates to such an implementation of the invention, but it will be appreciated that the invention can be implemented in many other forms for many other applications.

Figure 1:
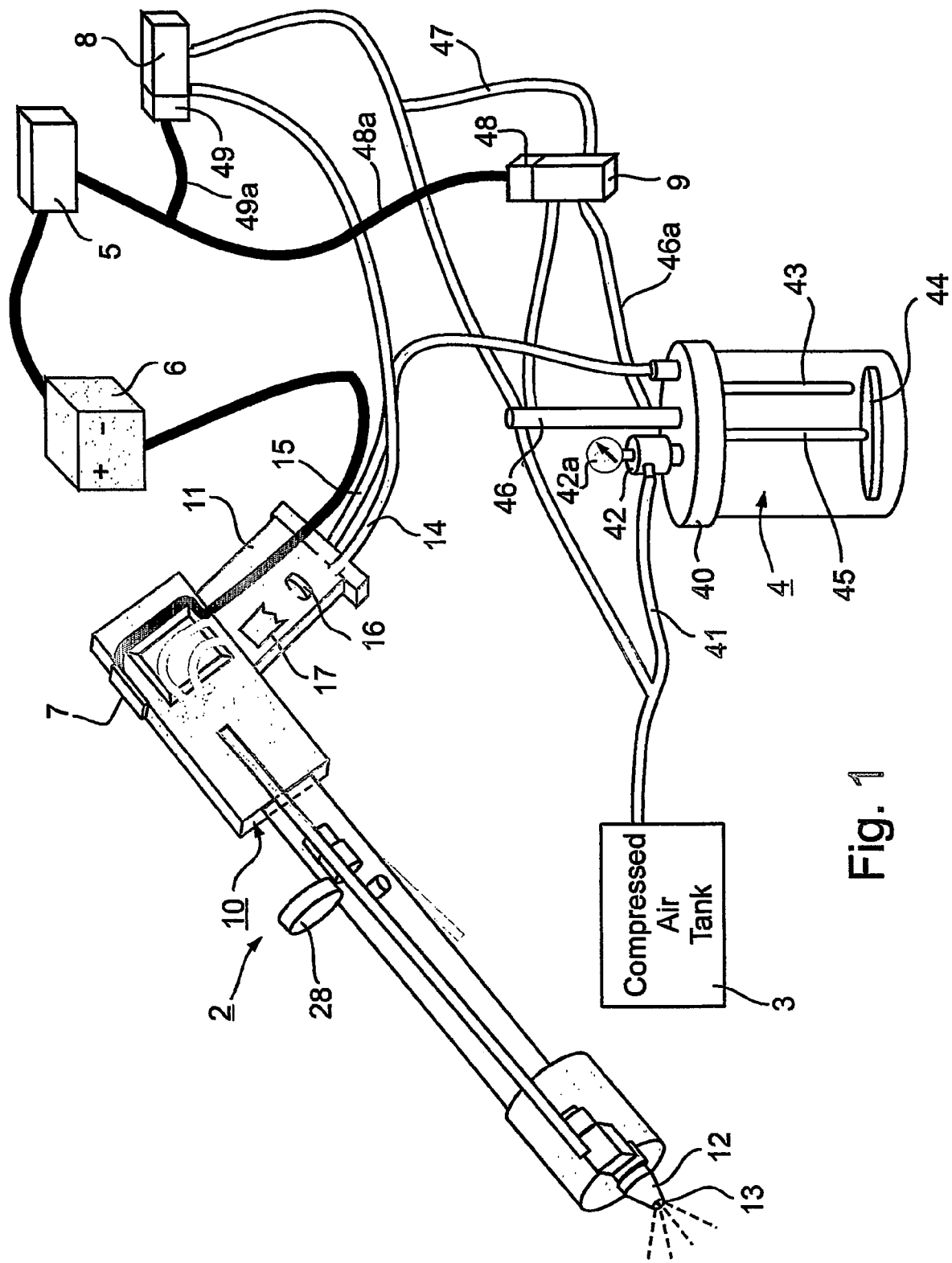
FIG. 1 pictorially illustrates a portable liquid discharge apparatus constructed in accordance with the present invention for use as a portable inoculation gun for anti-virus inoculation of plants.

FIG. 1 illustrates the overall apparatus. It includes a portable applicator unit 2 adapted to be conveniently carried by the user and to be actuated to discharge, at high velocity, a quantity of a gas together with a quantity of liquid, as and where desired. In the preferred embodiment of the invention described below, the gas is compressed air supplied from a compressed air tank 3, and the liquid is a plant anti-virus inoculation liquid supplied from a portable liquid container 4. A preferred liquid would be a mixture including a virus homogenate, a buffer, and carbordrum to facilitate virus entry. Other liquids that may be used for this purpose are known in the prior art, such as in the above-cited International Application PCT/IL00/00039 and the references cited therein.

The apparatus illustrated in FIG. 1 further includes a central control unit 5 electrically supplied by battery 6 controlled by a manually manipulable member in the form of an electrical switch 7 on the portable applicator unit 2. Central control unit 5 electrically controls a valve unit 8 which controls the compressed-air delivery system for delivering compressed-air to the portable applicator unit 2, and to the liquid container 4. Central control unit 5 electrically controls another valve unit 9 which controls a mixer within the portable liquid container 4, as will be described more particularly below.

The portable applicator unit 2 includes a housing, generally designated 10, having a handle 11 at one end configured for convenient grasping by a user, and a nozzle 12 at the opposite end for discharging the gas and liquid from a discharge opening 13 in the nozzle. Housing 10 carries the electrical switch 7 at a location conveniently accessible for actuation by the user when gripping the handle 11. Compressed air is supplied to the portable applicator unit 2 from the compressed air tank 3 via valve unit 8 and an air tube 14 connected to handle 11. Liquid is supplied to the portable applicator unit 2 from the liquid container 4 via a liquid tube 15 also connected to handle 11. Handle 11 further includes a flow regulator valve 16 for regulating the flow of the inletted liquid, and a cut-off valve 17 for cutting-off the flow of liquid from liquid container 4 when no liquid is to be discharged by the applicator unit 2.

Figure 2:
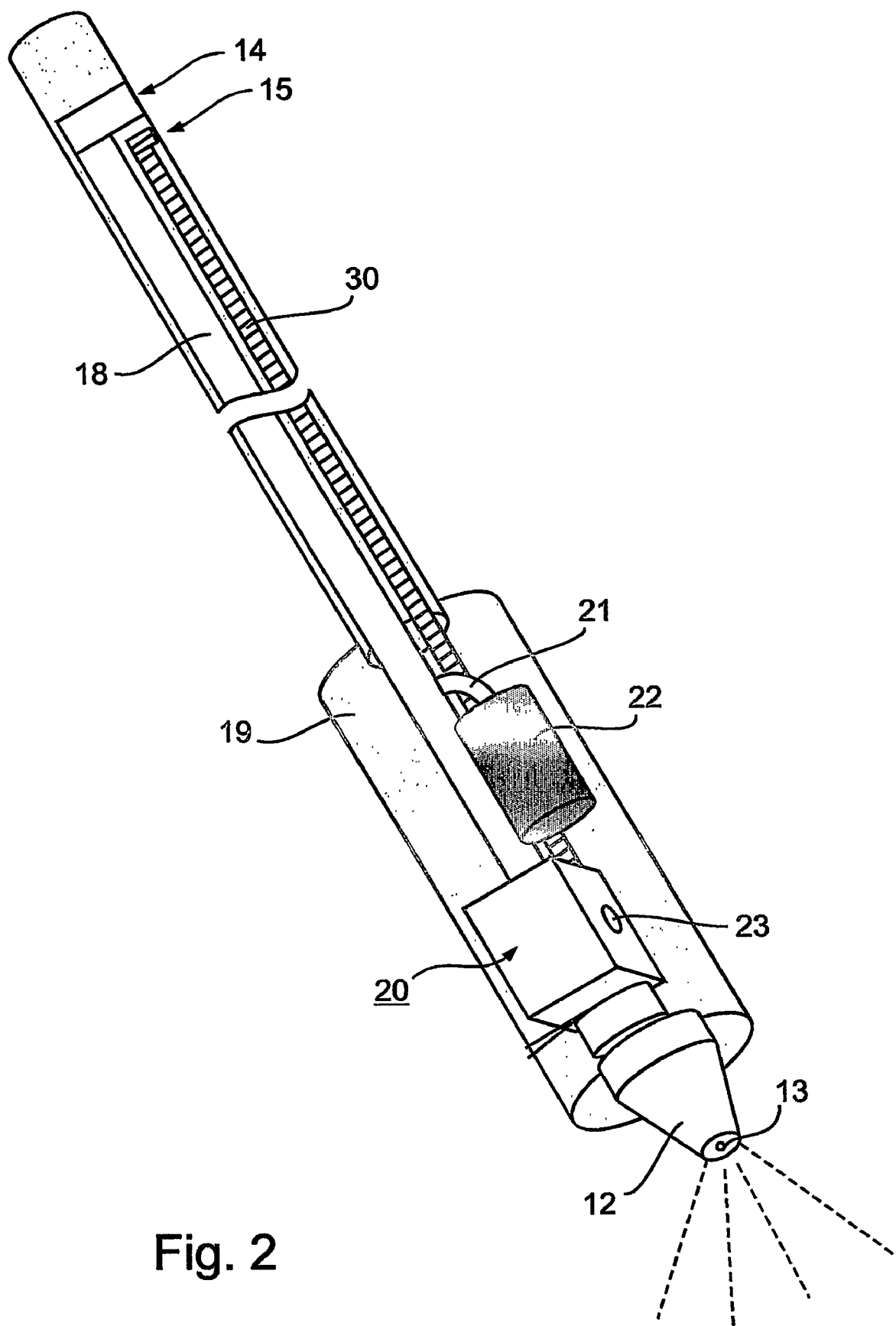
FIG. 2 more particularly illustrates the construction of the portable applicator unit in the apparatus of FIG. 1.

FIG. 2 more particularly illustrates the construction of the portion of portable applicator unit 2 conducting compressed air from air tube 14 and liquid from liquid tube 15 to the nozzle 12 for discharge from discharge opening 13.

The path for the compressed air includes an inner conduit 18 extending through housing 10 and through a chamber 19 to a quick-exhaust valve 20 adjacent to nozzle 12. Chamber 19 serves as a reservoir within housing 10 for defining a predetermined volume of pressurized air. It communicates with the pressurized air conduit 18 by a branch 21 from that conduit, and a one-way valve 22 permitting air flow only in the direction from air conduit 18 to chamber 19, and not in the reverse direction.

Figure 4:
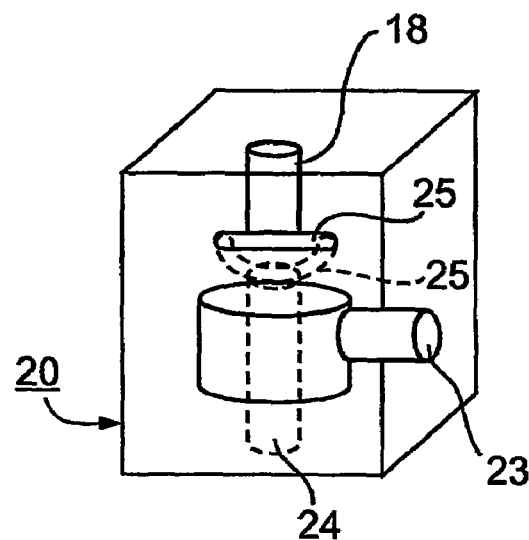
FIG. 4 schematically illustrates the quick-exhaust valve in the portable applicator unit of FIGS. 1 and 2.

The construction of the quick-exhaust valve 20 is more particularly illustrated in FIG. 4. It includes an inlet 23 in continuous communication with air reservoir 19, and an outlet 24 controlled by a control member 25 adjacent to the open end of the air conduit 18. Control member 25 may be a deformable diaphragm which, in its normal state, opens the valve outlet 24. Control diaphragm 25 is actuatable by the pressure within conduit 18 to a first position (shown in broken lines) closing the valve outlet 24 to permit the reservoir to be pressurized with air from the external source (compressed air tank 3, FIG. 1). Control diaphragm 25 is movable to a second position (its normal state shown in full lines) wherein it opens the valve outlet 24 to discharge a pulse of air at high-velocity from the reservoir through the discharge opening 13 (FIG. 5) in the nozzle 12.

As described more particularly below, control diaphragm 25 is moved to the mentioned first (broken-line) position by the compressed air from the external source 3 (FIG. 1) and to the second position by an interruption in the pressure of the pressurized air from the external source caused by actuating electrical switch 7.

Figure 5:
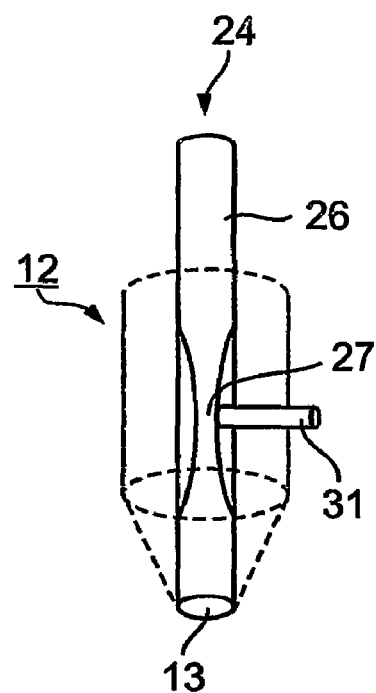
FIG. 5 schematically illustrates the construction of the nozzle in the portable applicator unit of FIGS. 1 and 2.

FIG. 5 more particularly illustrates the construction of nozzle 12 connected to outlet 24 of the quick-exhaust valve 20. Thus, as shown in FIG. 5, nozzle 12 includes an air passageway 26 connecting valve outlet 24 with discharge opening 13 of the nozzle 12. A portion of air passageway 26, just before the discharge opening 13, is of reduced cross-section, as shown at 27, thereby increasing the velocity of the air flowing through the passageway and reducing the static pressure thereat. As described below, the reduced pressure at passageway portion 27 draws liquid into that passageway, which liquid is discharged with the high-velocity discharge of air from discharge opening 13. The pressure of the pressurized air within reservoir 19 may be indicated by a gas pressure meter 28 (FIG. 1).

Housing 10 of the portable applicator unit 2 is further formed with an internal liquid conduit 30 (FIG. 2) communicating with the external liquid tube 15 connected to the liquid container 4 (FIG. 1). Liquid conduit 30 communicates with a liquid passageway 31 (FIG. 5) in nozzle 12. As shown in FIG. 5, liquid passageway 31 communicates with the reduced cross-section portion 27 of the air passageway 26. The high-velocity of air passing through portion 27 of the air passageway 26 thus draws, by the Venturi effect, a quantity of liquid from the liquid container 4 via liquid passageway 31 in nozzle 12, and the internal liquid conduit 30 in housing 10.

Figure 3:
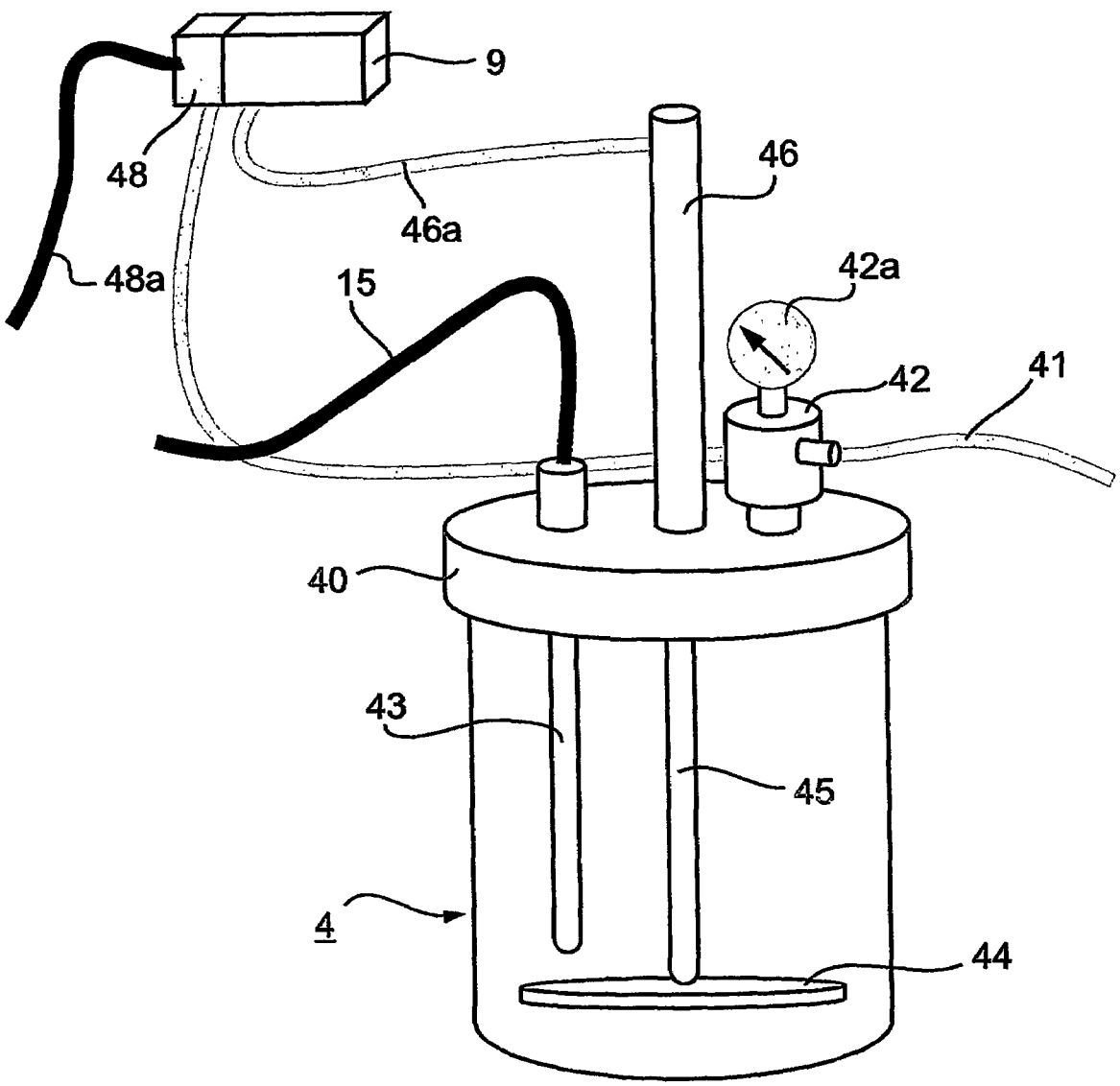
FIG. 3 more particularly illustrates the construction of the portable liquid container in the apparatus of FIG. 1 for containing the inoculation liquid.

Liquid container 4 is more particularly illustrated in FIG. 3. It includes a removable cover 40 to permit filling the container with the liquid to be discharged by the manual applicator unit 2 (FIG. 1). Cover 40 also seals the interior of the container so as to enable it to be pressurized for feeding its liquid contents via liquid tube 15 to the liquid conduit 30 (FIG. 2) of the portable applicator unit 2.

The interior of container 4 is pressurized by the compressed air source 3 (FIG. 1) via an air tube 41 connected thereto via a pressure regulator valve 42 carried by cover 40 and including a pressure-indicator 42a. The pressure within container 4 feeds liquid therein, via a feed tube 43 and the liquid tube 15, to conduit 30 (FIG. 2) within the portable applicator unit 2.

In order to assure uniformity in the liquid fed to the portable applicator unit 2, container 4 includes an agitator-type mixer 44 carried by a stem 45 driven axially (up-and-down) by a piston-cylinder drive 46. As shown in FIG. 1, drive 46 is controlled by control valve 9 via tube 46a and is connected to the compressed air source 3 via tube 47. As also shown in FIG. 1, valve 9 is electrically controlled by an electrical solenoid 48 connected to the central control unit 5 by electrical cable 48a.

Control valve 8, controlling the supply of compressed air to the air tube 14 leading to air conduit 18 within the portable applicator unit 2, is also controlled by a solenoid 49 connected by electrical cable 49a to the central control unit 5. The central control unit 5, powered by battery 6, is in turn controlled by manual electrical switch 7 provided on the applicator unit 2.

OPERATION

The apparatus illustrated in the drawings may be operated as follows: It will be first assumed that the liquid container 4 is filled with the liquid to be discharged by the portable applicator unit 2 and is connected thereto by liquid tube 15; and that the compressed air supply 3 is connected by tube 41 to container 4 for pressurizing it, and by tube 14 to the portable applicator unit 2 for supplying compressed air thereto via control valve 8.

It will also be assumed that control valve 8 is in its open condition, whereby the compressed air from source 3 is applied via tube 14 to the air conduit 18 (FIG. 2) of the portable applicator unit 2. The pressure within conduit 18 moves control diaphragm 25 (FIG. 4) within quick-exhaust valve 20 to its broken-line position. The compressed air conduit 18 is continuously connected to reservoir 19 via branch conduit 21 and one-way valve 22, thereby continuously pressurizing the reservoir 19. The broken-line position of control member 25 closes the outlet 24 of quick-exhaust valve 20 so that there is no flow of high-pressure gas through the air channel 25 (FIG. 5) of nozzle 12. Accordingly, reservoir 19 is filled with compressed air, and there is no discharge of air or of liquid from discharge opening 13 of nozzle 12. Preferably, the cut-off valve 17 within handle 11 of the portable applicator unit 2 is in its closed position to prevent any leakage of liquid from the nozzle at this time.

When it is desired to discharge liquid from the nozzle, electrical switch 7 of the portable applicator unit 2 is depressed to thereby actuate the central control unit 5 to cause the air valve 8 to interrupt the supply of compressed air via tube 14 to the gas conduit 18 in the applicator unit 2. When the supply of compressed air is thus interrupted, control diaphragm 25 within quick-exhaust valve 20 moves to its natural full-line position shown in FIG. 4, wherein it opens outlet 24 of the quick-exhaust valve 20. Thus, the high pressure within reservoir 19 discharges a gas pulse at high-velocity through gas passageway 26 of the nozzle 12; reservoir 19 is immediately recharged with another quantity of compressed air via branch pipe 21 and one-way valve 22.

The reduced cross-section portion 27 of gas passageway 26 increases the velocity of the gas passing therethrough to the discharge opening 13, and thereby reduces the static pressure at the end of the liquid passageway 31 connecting the liquid conduit 30 to the discharge opening 13. This reduced static pressure draws a quantity of liquid from container 4, via liquid tube 15, liquid conduit 30 extending through the applicator unit 2, and liquid passageway 31 in nozzle 12, to thereby discharge a quantity of the liquid with the air at high-velocity through the discharge opening 13.

When electrical switch 7 is released, central control unit 5 controls air valve 8 to interrupt the flow of pressurized air from source 3 via air tube 14 to air conduit 18, whereby control diaphragm 25 returns to its broken-line position shown in FIG. 4, closing outlet 24 of the quick-exhaust valve 20 and thereby terminating the gas and liquid discharge. Since reservoir 19 is continuously connected to the compressed-air tank 3 via branch 21 and one-way valve 22, it remains continuously pressurized for discharging another quantity of liquid by again depressing electrical switch 7.

While the invention has been described with respect to one preferred embodiment, it will be appreciated that this is set forth merely for purposes of example, and that many variations and other applications may be made. For example, the compressed air tank 3 may be replaced by a tank of another type of compressed gas, or by another source of compressed air. Also, a pump-type mixer may be used, rather than the illustrated agitator-type mixer, in the liquid container 4. For example, such a pump-type mixer could include a pump externally of the liquid container having two pipes communicating with the container interior, one pipe for drawing liquid from the container into the pump, and the other for pumping liquid from the pump back into the container, thereby continuously mixing the liquid within the container. In addition, the illustrated apparatus may be used for spray coating, e.g., spray painting, or for discharging other types of liquids to be accompanied by a discharge of air or other gas at high velocity. Many other variations, modifications and applications of the invention will be apparent.

What is claimed is:

1. Liquid discharge apparatus, comprising:
   a portable liquid applicator unit including housing having a handle at one end configured for convenient grasping by a user, a nozzle at the opposite end for discharging liquid from a discharge opening therein, and a maniputable member manually actuatable to produce a discharge of liquid from said nozzle;
   said nozzle including a gas passageway communicating with said discharge opening, and a liquid passageway communicating with said gas passageway;
   a gas delivery system actuatable by said maniputable member to discharge gas at high-velocity through said discharge opening in said nozzle via said gas passageway therein;
   and a liquid source communicating with said liquid passageway in the nozzle such that each high-velocity discharge of gas from said nozzle via said gas passageway draws a quantity of liquid from said liquid source into said gas passageway and discharges same at high-velocity with said gas through said discharge opening.

2. The apparatus according to claim 1, wherein said gas delivery system includes a reservoir within said housing defining a predetermined volume of pressurized gas, and a control device actuatable by said maniputable member to deliver from the reservoir said predetermined volume of pressurized gas, in the form of a high-velocity pulse, to said gas passageway in the nozzle and to discharge same, with the quantity of liquid drawn therein, through said discharge opening.

3. The apparatus according to claim 2, wherein said gas delivery system further includes an external source of pressurized gas externally of said housing and connected to said reservoir with said housing for supplying pressurized gas thereto.

4. The apparatus according to claim 3, wherein said gas delivery system further includes a quick-exhaust valve having a valve inlet communicating with said gas reservoir and a valve outlet controlled by a control member, said control member being actuatable to a first position closing said valve outlet to permit the reservoir to be pressurized with gas from said external source, and to a second position opening said valve outlet to discharge a gas pulse at high-velocity therethrough and through said discharge opening in the nozzle via said gas passageway in the nozzle.

5. The apparatus according to claim 4, wherein said control member is moved to said first position by pressurized gas from said external source, and to said second position by an interruption in the pressure of the pressurized gas from said external source.

6. The apparatus according to claim 5, wherein said external source of pressurized gas is continuously connected to said reservoir by a one-way valve permitting gas flow into the reservoir.

7. The apparatus according to claim 1, wherein said gas passageway in the nozzle is reduced in cross-section for a portion of its length, said liquid passageway in the nozzle communicating with said gas passageway at the portion thereof of reduced cross-section to thereby increase, by the Venturi effect, the quantity of liquid drawn into the gas and discharged therewith through said discharge opening.

8. The apparatus according to claim 1, wherein said liquid source includes a container for the liquid external to said housing and connected thereto by an external liquid tube.

9. The apparatus according to claim 8, wherein said housing includes an internal liquid conduit communicating at one end with said external liquid tube and at the opposite end with said liquid passageway in the nozzle.

10. The apparatus according to claim 9, wherein said liquid container is also connected to said gas delivery system such as to be pressurized by the gas thereof for feeding liquid therefrom to said internal liquid conduit.

11. The apparatus according to claim 10, wherein said internal liquid conduit includes a flow regulator for regulating the liquid flow therethrough.

12. The apparatus according to claim 8, wherein said liquid container includes a mixer for mixing the liquid therein.

13. The apparatus according to claim 1, wherein said gas delivery system is designed to deliver compressed air to said nozzle, and said liquid source is designed to deliver a plant anti-virus inoculation liquid to said nozzle to be discharged at high-velocity with said compressed air through said discharge opening.

14. The apparatus according to claim 1, wherein said maniputable member is an electrical switch carried by said handle and electrically controlling a valve in said gas delivery system.

15. Liquid discharge apparatus, comprising:
a housing including a nozzle having a discharge opening, a gas passageway communicating with said discharge opening, and a liquid passageway communicating with said gas passageway;
a gas delivery system including a reservoir within said housing defining a predetermined volume of pressured gas, and a control device actuatable to deliver from the reservoir said predetermined volume of pressurized gas in the form of a high-velocity pulse to said gas passageway in the nozzle for discharge through said discharge opening therein;
and a liquid source communicating with said liquid passageway in the nozzle such that each high-velocity discharge of gas from said nozzle via said gas passageway draws a quantity of liquid from said liquid source and discharges same at high-velocity with said gas through said discharge opening.

16. The apparatus according to claim 15, wherein said gas delivery system further includes a quick-exhaust valve having a valve inlet communicating with said gas reservoir, and a valve outlet controlled by a control member; said control member being actuatable to a first position closing said valve outlet to permit the reservoir to be pressurized with gas from said external source, and to a second position opening said valve outlet to discharge a gas pulse at high-velocity therethrough and through said discharge opening in the nozzle via said gas passageway in the nozzle.

17. The apparatus according to claim 16, wherein said valve member is moved to said first position by pressurized gas from said external source, and to said second position by an interruption in the pressure of the pressurized gas from said external source.

18. The apparatus according to claim 16, wherein said gas delivery system further includes a one-way valve effective to pass pressurized gas from said external source to said gas reservoir.

19. The apparatus according to claim 15, wherein said gas passageway in the nozzle is reduced in cross-section for a portion of its length, said liquid passageway in the nozzle communicating with said gas passageway at the portion thereof of reduced cross-section to thereby increase, by the Venturi effect, the quantity of liquid drawn into the gas and discharged therewith through said discharge opening.

20. The apparatus according to claim 15, wherein said gas delivery system is designed to deliver compressed air to said nozzle, and said liquid source is designed to deliver a plant anti-virus inoculation liquid to said nozzle to be discharged at high-velocity with said compressed air through said discharge opening.

* * * * *